United States Patent [19]

James et al.

[11] Patent Number: 5,860,080
[45] Date of Patent: Jan. 12, 1999

[54] MULTICASTING SYSTEM FOR SELECTING A GROUP OF MEMORY DEVICES FOR OPERATION

[75] Inventors: David V. James, Palo Alto; Glen D. Stone, San Jose, both of Calif.

[73] Assignee: Apple Computer, Inc., Cupertino, Calif.

[21] Appl. No.: 618,628

[22] Filed: Mar. 19, 1996

[51] Int. Cl.$^6$ .................................................. G06F 12/00
[52] U.S. Cl. ...................... 711/4; 711/1; 711/5; 711/111; 711/112; 370/390
[58] Field of Search .................................. 711/1, 3, 4, 5, 711/111, 101, 112; 395/200.5; 370/401, 390, 408, 452

[56] References Cited

U.S. PATENT DOCUMENTS

| | | | |
|---|---|---|---|
| 4,792,947 | 12/1988 | Tahiyasu et al. | 370/452 |
| 5,079,767 | 1/1992 | Perlman | 370/408 |
| 5,459,725 | 10/1995 | Bodner et al. | 370/390 |
| 5,539,737 | 7/1996 | Lo et al. | 370/401 |
| 5,644,571 | 7/1997 | Seaman | 370/401 |
| 5,758,070 | 5/1998 | Lawrence | 395/200.5 |

OTHER PUBLICATIONS

IEEE Computer Society, *IEEE Draft Standard for High-Bandwidth Memory Interface Based on SCI Signaling Technology (RAMLINK)*, May 19, 1995:(pp. i–104).

*Primary Examiner*—Eddie P. Chan
*Assistant Examiner*—T. V. Nguyen
*Attorney, Agent, or Firm*—Fenwick & West LLP

[57] ABSTRACT

A system and method for multicasting control signals to selectively operate one memory device or groups of memory devices comprises a memory controller coupled to a plurality of memory devices by a command bus and a data bus. Each of the plurality of memory devices has a unique identification number. The system provides an addressing scheme in which an individual memory device or groups of memory device can be selected for operation by addressing the devices with a command packet. The memory controller broadcasts a command packet over the command bus to the plurality of memory devices. The packet includes an identification number. At each of the memory devices, selection logic is included to make the memory device operational if the identification number in the packet matches the identification number assigned to the memory device. The address in the packet is preferably encoded such that identification number has the same size regardless of whether a single memory device is being selected for operation or a group of memory devices are being selected for operation. The present invention also includes a method for selecting groups of memory devices for operation by multicasting a select address comprising the steps of: providing an memory identification number to each memory device, transmitting an memory device selection address, comparing the memory device selection address to the memory identification number, and asserting a signal to make the memory device operational if the memory device selection address and the memory identification number match.

20 Claims, 10 Drawing Sheets

MULTICASTING SYSTEM FOR SELECTING A GROUP OF MEMORY DEVICES FOR OPERATION

BACKGROUND OF THE INVENTION

1. Field of the Invention.

The present invention relates generally to memory devices in computer systems. In particular, the present invention relates to a system and method for specifying operation of one or more of a plurality of memory devices by multicasting address signals to the plurality of memory devices.

2. Description of the Background Art.

Figure 1A:
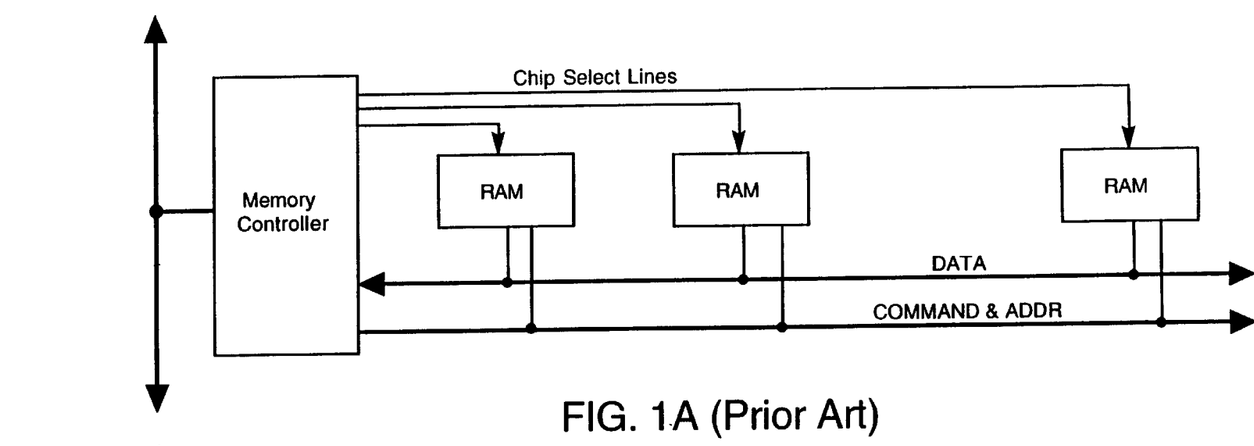
FIG. 1A is a block diagram of a first prior art memory system.
Figure 1B:
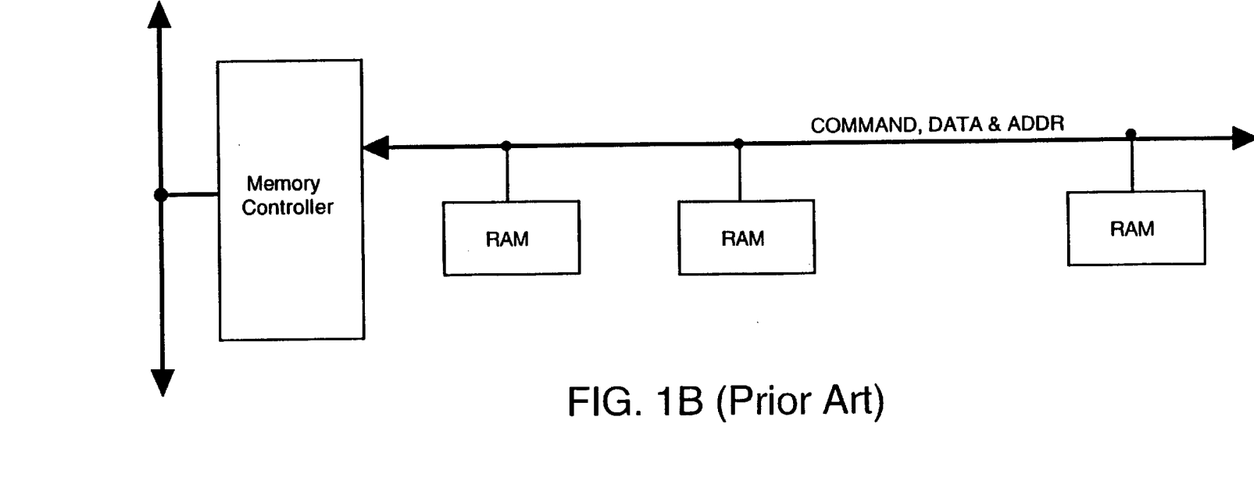
FIG. 1B is a block diagram of a second prior art memory system.

There are a variety of interconnect architectures for connecting memory devices to a controller. Examples of such prior art approaches are shown in FIGS. 1A and 1B. The prior art often uses a memory controller to provide the coupling between a system bus and the memory devices (RAM). As shown in FIG. 1A, the memory controller can be coupled to the memory devices by a command and address bus for passing command and address signals, and a data bus for sending and receiving data from the system bus. Typical prior art systems also include a series of chip select signal lines. The chip select signal lines are used to selectively activate the memory device(s) for operation. However, one significant problem with this prior art approach is that the chip select signal lines have different physical properties (i.e., varying lengths). Therefore, in high performance memory systems, the different physical properties of each signal line affect the timing characteristics for the chip select and command signals. In other words, the skew between the chip select signals and the command signals places a fundamental limit on the speed at which the commands can be sent between a memory controller and its attached memory devices. This is a particular problem when high speed bus architectures are used. Further, the use of individual chip select lines requires the memory controller have a pin for each chip select line which increases the cost of the memory controller. Similarly, when memory modules such as Single In-Line Memory Modules (SIMMs) or Dual In-Line Memory Modules (DIMMs) are used it is not practical to provide a pin for each chip select of each memory in the SIMM. Such an approach would require eight pins just for the chip select input to a SIMM having eight memories. Also, unless a large number of pins for chip select lines are provided, the flexibility or ability to use the memory controller with varying number of memory device is limited. Furthermore, there have been attempts in the prior art to adjust or add components to make the physical properties the same for all lines. This is very difficult to accomplish when the physics of the chip select signal lines (which attach to only one memory chip) and the address signal lines (which attach to all memory chips) are inherently different.

Yet another prior art approach is shown in FIG. 1B, and more fully disclosed in U.S. Pat. No. 5,319,755 issued to Farmwald et al. FIG. 1B illustrates a memory controller coupled to the memory devices by a combined command, address and data bus. In this second prior art approach, one of the memory devices can be addressed or special transactions (like refresh) can be broadcast to all memory devices. While this approach does not suffer from the shortcomings of the approach in FIG. 1A, this second approach does not offer the flexibility of selecting groups of memory devices for operation. Further not all commands can be broadcast to groups of memory devices. For example, reads and other commands cannot be broadcast to the multiple memory devices because only one data bus is provided on which the memory devices can respond. Broadcast messages to the memory devices have been provided for this second approach, but they have been limited to clearing and refreshing the memory devices. Additionally, when memory modules (SIMMs, DIMMs, etc.) are used, the broadcast messages can only be used to select all memory modules and not an individual memory devices or an individual memory module for refreshing or clearing. Accessing an individual memory device is useful when only one byte is being modified. Accessing one memory module is useful for reading or writing a block of locations (a memory line), where each memory device contains a portion of that memory line. Both types of accesses are not possible with the prior art approach of FIG. 1B.

Thus, there is a continuing need for a system and method for selecting individual or groups of memory device for operation. This system and method should not require extensive hardware and be adaptable to a variety of memory architectures that include the use of memory modules.

SUMMARY OF THE INVENTION

The present invention overcomes the deficiencies and limitations of the prior art with a system and method for multicasting control signals to memory devices to identify individual or groups of memory devices for operation. The preferred embodiment of a multicasting memory system advantageously eliminates the different physical properties in selecting memory devices for operation and also eliminates skew between the chip select signals and the command signals which have heretofore placed a fundamental limit on the speed at which the commands can be sent between a controller and memory devices. The multicasting memory system also allows individual memory devices within memory modules to be selectively activated.

The multicasting system preferably comprises a memory controller and a plurality of memory devices coupled by a command & address bus and a data bus. Each memory device preferably includes an ID register, a comparator, control logic, and a memory. The comparator is coupled to receive a chip select portion of the address on the command and address bus, and the output of the ID register. The comparator compares signals from the ID register to signals on the command and address bus, and outputs a signal to activate operation of the DRAM. The control logic is also coupled to receive the remaining portion of the address and a command from the command and address bus. These signals are in turn applied to the address and control inputs of the memory. The multicasting system preferably provides a plurality of addresses for selection of a memory for operation (chip select). The plurality of addresses preferably include an address for activating each memory individually, an address for activating groups of 2, 4, 6, 8 and 16 memories, and an address for activating all the memories.

The present invention also includes a method for selecting groups of memory devices for operation by multicasting a select address and a method for initializing the ID register of memory devices. The method for selecting groups of memory devices for operation by multicasting a select address preferably comprises the steps of: providing an memory identification number to each memory device, transmitting an memory device selection address, comparing the memory device selection address to the memory identification number, and asserting a signal to make the memory device operational if the memory device selection address to the memory identification number match.

DETAILED DESCRIPTION OF THE PREFERRED EMBODIMENTS

Figure 2:
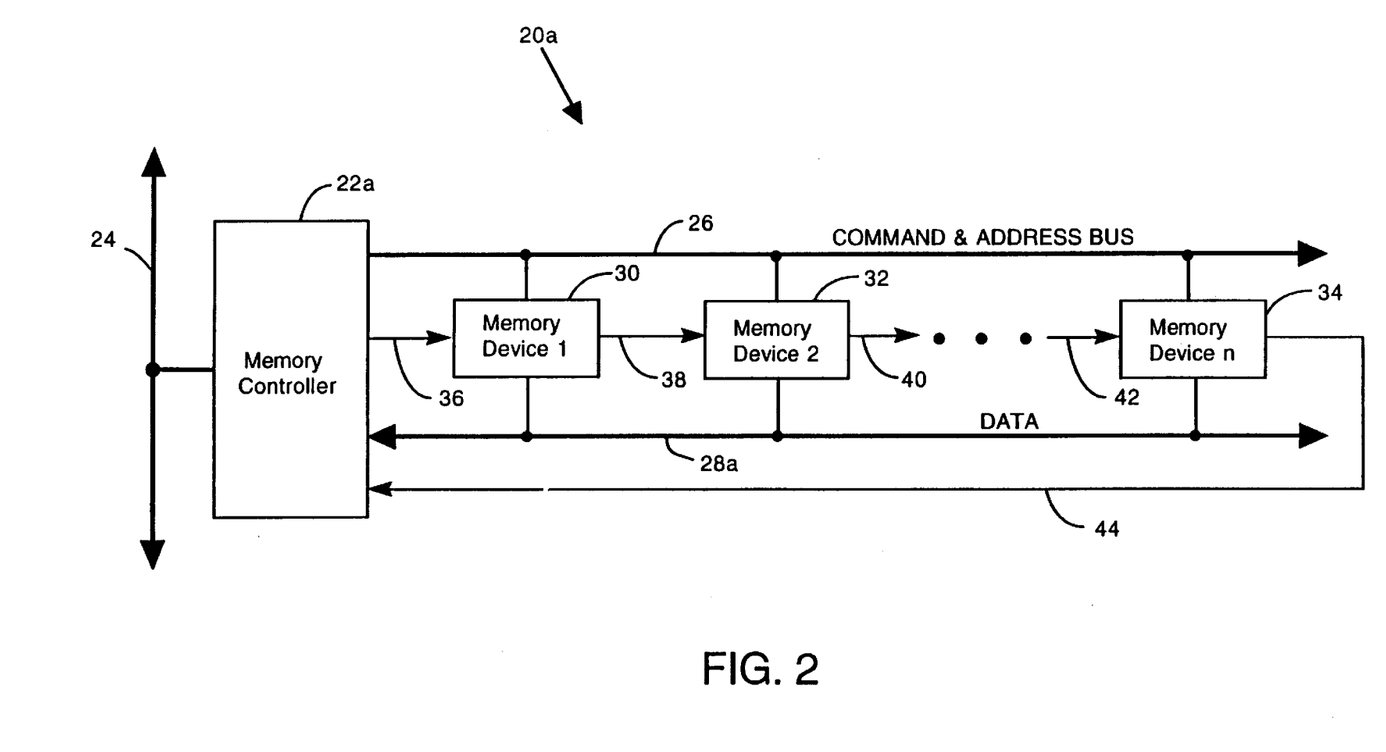
FIG. 2 is a block diagram of a multicasting memory system constructed according to the present invention.

Referring now to FIG. 2, a block diagram of a first and preferred multicasting memory system 20a is shown. The multicasting memory system 20a comprises a memory controller 22a, a first memory device 30, a second memory device 32, and a third memory device 34. While the system 20a will now be described specifically with reference to a system having a three memory devices, those skilled in the art will realize that the present invention applies to a variety of systems having more or less than three memory devices as will be described below with reference to the other embodiments of the invention. The system 20a also includes a first bus 26 for sending or broadcasting address and command signals from the memory controller 22a to the first, second and third memory devices 30, 32, 34; and a second bus 28a coupling the memory controller 22a to the first, second and third memory devices 30, 32, 34 for sending data between the memory controller 22a and the first, second and third memory devices 30, 32, 34. The memory controller 22a is also coupled to a system bus 24.

The multicasting memory system 20a of the present invention also includes a plurality of signal lines 36, 38, 40, 42 and 44. The plurality of signal lines 36, 38, 40, 42 and 44 are daisy chained from the memory controller 22a to the first memory device 30, and so forth to each memory device 32, 34 to permit the transmission of a signal from the memory controller 22a, through each of the memory devices 30, 32 and 34 and then back to the memory controller 22a on signal line 44. This daisy chained signal path provides a mechanism for initializing the multicasting memory system 20a. In particular, the multicasting memory system 20a is initialized by storing a unique slave identification number in each of the memory devices 30, 32, 34.

As shown in FIG. 2, the memory controller 22a serves as an interface between the system bus 24 and the memory devices 30, 32, 34. The memory controller 22a translates addresses and commands from a first format used on the system bus to a second format suitable for the memory devices 30, 32, 34 to which the memory controller 22a is coupled. The second format depends on the architecture used to organize the memory devices 30, 32, 34. The memory controller 22a performs command and address translation in a conventional manner. The memory controller 22a preferably includes combinational logic and data buffers needed to translate and reformat the commands and data. This includes both commands, addresses and data for the memory devices 30, 32, 34 as well as the return of data from the memory devices 30, 32, 34 to the system bus 24. Those skilled in the art will understand the operations performed by the memory controller 22a from the description of initialization and use of the memory devices 30, 32, 34 that is detailed below. Moreover, those skilled in the art will realize how to construct the memory controller 22a to interface with system buses that have various sizes and have various commands and communication protocols.

In the multicasting memory system 20a of the present invention, multicast signals (a packet) are output by the memory controller 22a and applied to the command and address bus 26. Each packet requires a predetermined number of bits to provide the command and address information. Rather than provide a bus line for each address bit and command bit, the present invention provides a bus having a predetermined or predefined size, and then broadcasts a packet over several cycles on the command and address data bus 26. During initialization, as will be described below, each memory device 30, 32, 34 is given a unique memory identification number. Each packet contains a memory identification number that is an encoded address specifying groups (one or more) of memory devices 30, 32, 34 that are to process the remaining information (addresses and commands) in the packet. A packet is transmitted or multicast on the command and address bus 26, and then received and decoded at each memory device 30, 32, 34. Each of the memory devices 30, 32, 34 decodes the packet and uses the memory identification number from the packet to determine whether to process the command and addresses in the packet. Those memory devices 30, 32, 34 that have an identification number matching the memory identification number from the packet process the command and addresses in the packet; and those memory devices 30, 32, 34 that do not have an identification number matching the memory identification number remain inactive.

Figure 3:
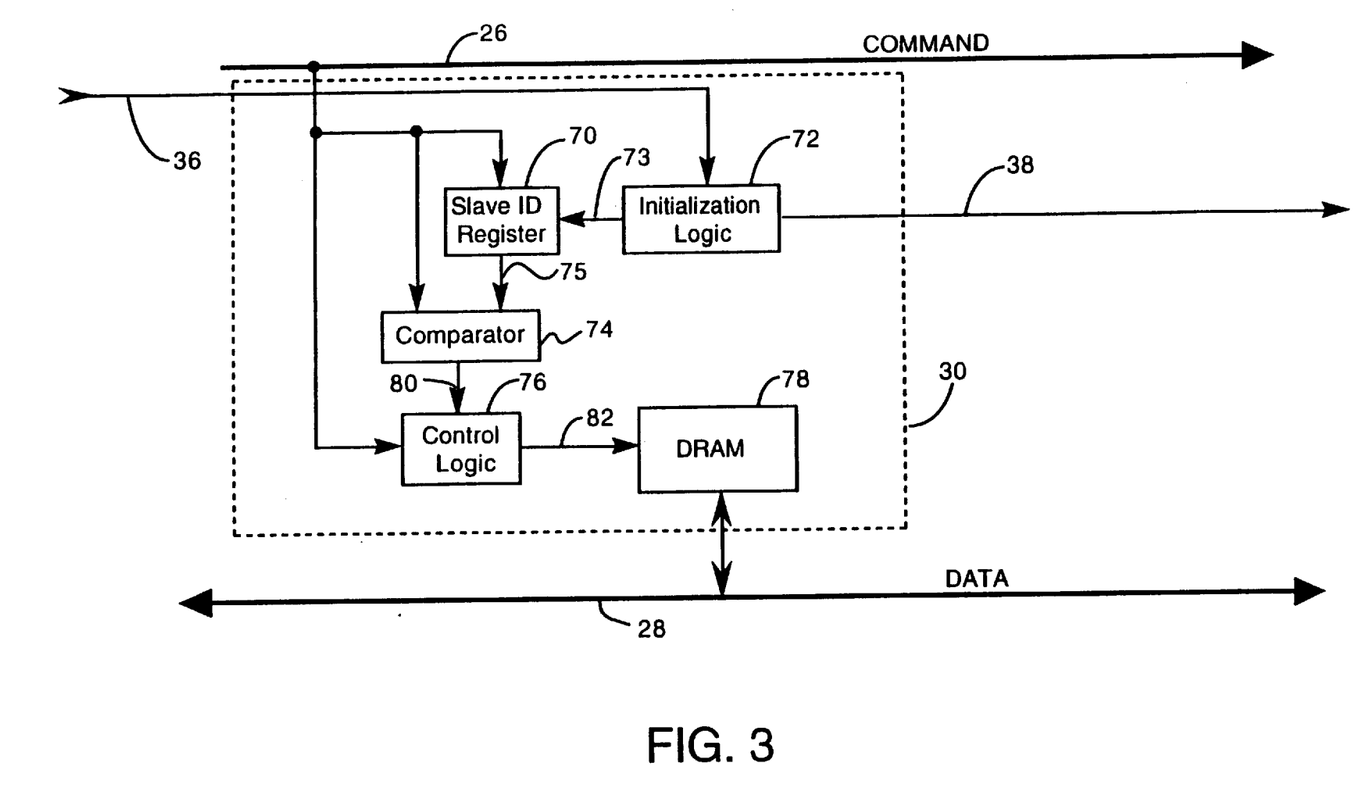
FIG. 3 is a block diagram of a preferred embodiment of the memory device constructed according to the present invention.

Referring now to FIG. 3, a preferred embodiment for a memory device 30 constructed according to the present invention is shown. Those skilled in the art will realize that the second and third memory devices 32, 34 (shown in FIG. 2) may have an identical structure to that of the first memory device 30 (shown in FIG. 2 and detailed in FIG. 3). The only difference between the memory devices 30, 32, 34 is their coupling in the daisy chain of signal lines 36, 38, 40, 42, 44 (shown in FIG. 2). As shown in FIG. 3, the preferred embodiment of the memory device 30 includes a slave identification register 70, initialization logic 72, a comparator 74, control logic 76 and a memory 78 such as a dynamic random access memory ("DRAM"). The memory 78 preferably has a plurality of memory lines for storing data. The memory 78 preferably has address and control inputs, and a bi-directional data port. The memory 78 outputs data (read operations) or stores data (write operations) in response to the commands applied to the control input and at locations in the memory 78 according to the address signal applied to the address inputs in a conventional manner. The memory 78 is selectively operational (responsive to address and command signals applied to the address and control inputs) by asserting a signal on the internal chip select input signal line 80. If the signal on the internal chip select signal line 80 is asserted then the control logic 76 ensures that the memory 78 is operational. If the signal on the internal chip select signal line 80 is not asserted then the memory 78 is not operational and will not respond to commands and addresses, although maintaining the data that is stored in the memory 78. The address and control inputs are coupled to line 82 to receive signals from the control logic 76. Finally, the bidirectional data port of the memory 78 is coupled to the data bus 28 to send and receive data.

The control logic 76 has a first input, a second input and an output, and translates the command and address signals in the packet 110 applied to the command & address bus 26 into signals that can be used to control the memory 78. In particular, the control logic 76 translates the multiple sequential bytes of information transmitted on the command & address bus 26 as a multicast signal packet 110 into an address and command that can be directly applied to the memory 78. For example in the preferred embodiment, the control logic 76 translates the six bytes of information forming a multicast packet 110, as will be described below, into a command and an address. The control logic 76 preferably includes buffers and combinational logic necessary to decode the command and address signals in the packet 110 as will be understandable to those of ordinary skill in the art. The first input of the control logic 76 is coupled to the command & address bus 26 to receive the command and address signals in the packet 110 from the memory controller 22a. The second input of the control logic 76 is coupled to the output of the comparator 80 to receive a internal chip select signal, which indicates whether the memory 78 should be made operational or not. If an asserted signal is received at the second input of the control logic 76, the control logic 76 responds by decoding the command and address information in the remaining portion of the packet 110, and providing the decoded signals 82 to the memory 78. The outputs of the control logic 76 provide decoded versions of the address and command signals and are coupled to the input of the memory 78.

A slave identification register 70 is provided for each memory device 30, 32, 34. The slave identification register 70 stores a unique identification number used to identify the respective memory device 30, 32, 34. The unique identification number stored in the slave identification register 70 is compared to a slaveID signal or selection address that is part of the multicast packet 110 to determine whether the command and information in the multicast packet 110 is for use by the memory device 30. The slave identification register 70 has a data input, a data output and a control input. The data input of the slave identification register 70 is coupled to the command & address bus 26 for receiving a unique identification number during initialization. The data output of the slave identification register 70 is coupled by signal line 75 to an input of the comparator 74. The control input of the slave identification register 70 is coupled by signal line 73 to the output of the initialization logic 72.

The memory device 30 includes a comparator 74 as has been noted above. The comparator 74 has a first set of inputs, a second set of inputs and an output. The comparator 74 compares the value stored in the slave identification register 70 to the slaveID value transmitted on the command & address bus 26 from the memory controller 22a. If the value stored in the slave identification register 70 and the slaveID value transmitted on the command & address bus 26 are the same, the comparator 74 asserts the internal chip select signal 80 on its output to make the memory 78 operational. The first set of inputs of the comparator 74 is coupled to the command & address bus 26; the second set of inputs of the comparator 74 is coupled to the output of the slave identification register 70; and the output of the comparator 74 is coupled to the second input of the control logic 76. The comparator 74 will be described in more detail below with reference to FIGS. 7 and 8.

The final element of the memory device 30 is the initialization logic 72. The initialization logic 72 is provided to load a unique identification number in the slave identification register 70. The initialization logic 72 has an input, a first output and a second output. For memory device 30, the input of the initialization logic 72 is coupled to line 36 to receive an initialization signal, and the first output is coupled by signal line 38 to send the initialization signal to the next memory device 32. The second output of the initialization logic 72 is coupled by signal line 73 to the control input of the slave identification register 70. The other memory devices 32, 34 also have initialization logic 72 and are similarly coupled with the input and first output of the initialization logic 72 of memory device 32 coupled to line 38 and line 40, respectively; and the input and first output of the initialization logic 72 of memory device 34 coupled to line 42 and line 44, respectively. During initialization, the memory controller 22a asserts the initialization signal on line 36. Simultaneously, the memory controller 22a sends an ID-assignment packet containing a first unique identification number on the command and address bus 26. The initialization logic 72 of the first memory device 30 is enabled by asserted signal on input line 36 and a non-asserted signal on output line 38. When so enabled, the initialization logic 72 loads the first unique identification number of the ID-assignment packet on the command and address bus 26 into its slave identification register 70. During the processing of the ID-assignment packet, the initialization logic 72 asserts the initialization signal on line 38. The memory controller 22a sends a second ID-assignment packet containing a distinct unique identification number on the command and address bus 26 to update the slave identification register 70 in the memory device 32 connected to 38. After each ID-assignment packet is sent, the asserted signal passes through each daisy-chained memory device 30, 32, 34, and a new, next ID-assignment packet (containing a different and unique identification number) is used to set the slave identification registers 70. The initialization logic 72 preferably includes a register (not shown) that latches the input signal on line 36 to drive the output signal on line 38 when an ID-assignment packet is observed. The input of the register is coupled to line 36 while the output of the register is coupled to line 38. When the signal on the line 36 and line 38 are not the same and the ID-assignment packet is observed, the initialization logic 72 outputs a signal on line 73 causing the slave identification register 70 to latch, and asserts the signal on line 38 to the value previously observed on line 36.

Figure 4A:
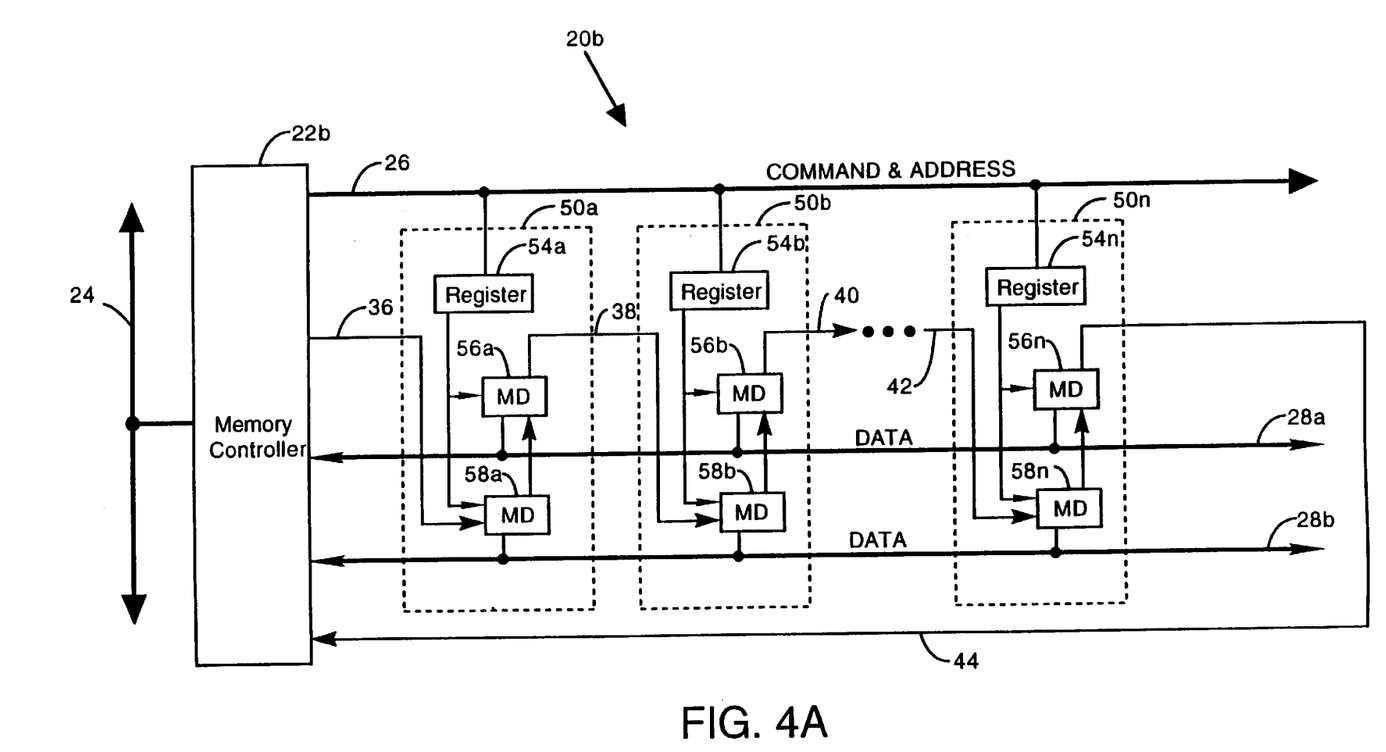
FIG. 4A is a block diagram of a multicasting memory system of the present invention used with memory modules each having two memory devices.

Referring now to FIG. 4A, a second embodiment of the multicasting memory system 20b of the present invention is shown. FIG. 4A illustrates the present invention in a memory architecture using single in-line memory modules (SIMMs). For convenience and ease of understanding like reference numerals have been used for like parts in the second embodiment 20b. Similar to the first embodiment 20a, the second embodiment 20b comprises the memory controller 22b, a system bus 24, a command and address bus 26, a first data bus 28a, and a plurality of signal lines 36, 38, 40, 42 and 44 for initialization. Each of these components operate in manner similar to the first embodiment as has been described above. The second embodiment 20b further comprises a second data bus 28b, a first memory module 50a, a second memory module 50b and a nth memory module 50n. While only three memory modules 50a, 50b, 50n are shown, those skilled in the art will realize that more or less than three memory modules 50a, 50b, 50n may be similarly connected. Each of the memory modules 50a, 50b, 50n is coupled to the command and address bus 26 and the plurality of signal lines 36, 38, 40, 42 and 44 like the memory devices 30, 32, 34. Each of the memory modules 50a, 50b, 50n preferably has an initialization input, an initialization output, a command input, a first bi-directional port and a second bi-directional port. For the first memory module 50a, the initialization input is coupled to the signal line 36; the initialization output is coupled to the signal line 38; the command input is coupled to the command and address bus 26; the first bi-directional port is coupled to the first data bus 28a; and the second bi-directional port is coupled to the second data bus 28b. The second and third memory modules 50b, 50n are similarly coupled. The memory controller 22b also has a second bi-directional port that is coupled to the second data bus 28b. The memory controller 22b is similar to memory controller 22a, and broadcasts commands and addresses on the bus 26 to which the memory modules 50a, 50b, 50n respond. The major difference between memory controller 22b and memory controller 22a is that memory controller 22b operates with the first and second data buses 28a, 28b instead of a single data bus 28a. This is a particularly advantageous feature of the present invention because it allows commands such as reads to be performed on multiple memory devices with each active memory device able to used one of the first and second data buses 28a, 28b Each of the memory modules 50a, 50b, 50n preferably comprises a register 54, a first memory device (MD) 56 and a second memory device (MD) 58. While the coupling and interaction of these components will now be described with reference to the first memory module 50a, those skilled in the art will realize that the other memory modules 50b, 50n have identical functionality and structure. The register 54a has an input and output, and the input of the register 54a is coupled to the command and address bus 26. The register 54a receives the packet 110 asserted on the command and address bus 26, and passes it on to multiple memory devices 56a, 58a. The register 54a is preferably clocked on each transition in the system clock, thereby delaying information from the bus 26 to the memories 56a, 58a by a fixed amount of time, preferably by the time between transitions in the clock signal. The register 54a passes information through to the memory devices 56a and 58a, and is used to electrically isolate the command and address bus 26 from the traces to the memories 56a, 58a. Thus, the varying lengths of the traces from the register 54a to the memories 56a, 58a does not affect the physical characteristics of the bus 26. The register 54a also provide buffering such that the memory controller 22b does not have to directly drive all the memories 56a, 58a, thereby reducing the load on the command and address bus 26. The output of the register 54a is coupled to the command input of both the first memory device 56a and the second memory device 58a. The first and second memory devices 56a, 58a each have a control input, a command input, a control output, a bi-directional data port. The first and second memory devices 56a, 58a each preferably provide the same structure and functionality as the memory device 30 shown in FIG. 3. The bidirectional data port of the first memory device 56a is coupled to the first data bus 28a and the bi-directional data port of the second memory device 58a is coupled to the second data bus 28b. The control input of the second memory device 58a forms the initialization input of the memory module 50a and is coupled to signal line 36. The control output of the second memory device 58a is coupled or daisy-chained to the control input of the first memory device 56a. The control output of the first memory device 56a forms the initialization output of the memory module 50a and is coupled to signal line 38. Thus, a daisy chained signal path to each memory device 58a, 56a, 58b, 56b, 58n, 56n is provided internal to the memory module 50a as well as a daisy chained signal path between the memory modules 50a, 50b, 50n. This allows each memory device 56a, 58a to be initialized with a different and unique slave identification number. Thus, during initialization, the initialization signal is asserted on the control input of the second memory device 58a and the unique slave identification number sent in an ID-assignment packet is broadcast to all memory devices, arriving at the command input of the second memory device 58a via register 54a. Then the next memory device 56a is initialized as the initialization signal is passed from the second memory device 58a to the first memory device 56a and applied to the control input of the first memory device 56a and a next ID-assignment packet containing a unique slave identification number is broadcast to all memory devices, arriving at the command input of the first memory device 58a via register 54a. The initialization process proceeds as each memory device 58a, 56a, 58b, 56b, 58n, 56n is initialized by passing the initialization signal along the daisy-chained path, and continues until the initialization signal returns to the controller 22b on line 44. Based on the above description of the first memory module 50a, those skilled in the art will realize that the other memory modules 50b, 50n provide an identical or similar structure and functionality.

Figure 4B:
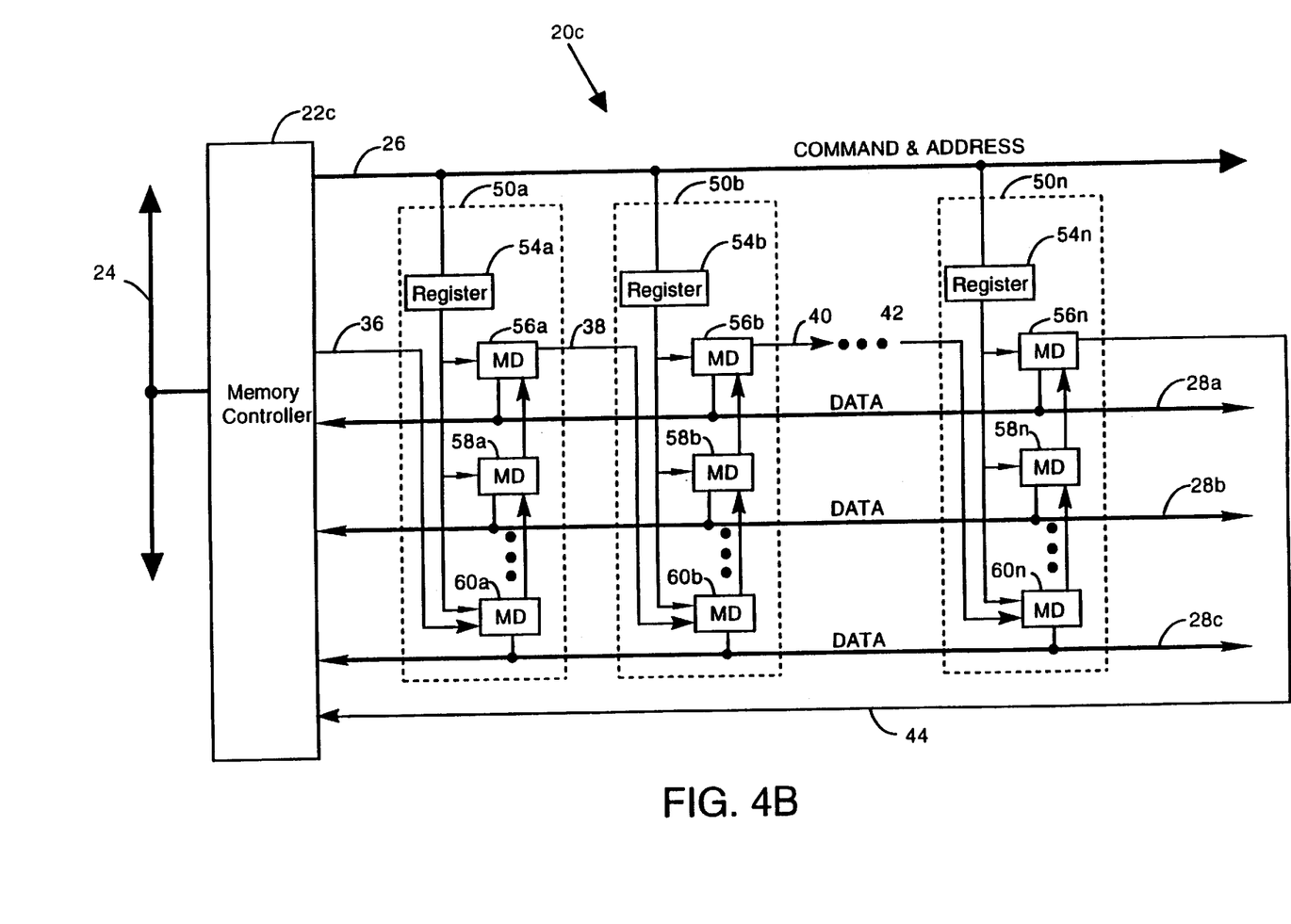
FIG. 4B is a block diagram of a multicasting memory system of the present invention used with memory modules each having more three or more memory devices.

Referring now to FIG. 4B, yet another embodiment of the present invention is shown. The third embodiment of the multicasting memory system 20c is similar to the second embodiment of the multicasting memory system 20b, and therefore, like reference numbers have again been used to specify like parts. The third embodiment of the multicasting memory system 20c demonstrates that the memory modules 50a, 50b, 50n may each comprise more than two memory devices 56a, 58a, 60a. The number of memories is preferably a power of two or a multiple of nine, even though only three memories 56a, 58a, 60a are shown for each memory modules 50a, 50b, 50n. The notable differences in the third embodiment of the multicasting memory system 20c include a memory controller 22c that provides a third bi-directional port that is coupled to a third bus 28c. This third bus 28c provides a parallel data path to which the memory devices 60a, 60b, 60c are coupled. While the memory modules 50a, 50b, 50n are shown as only having three memory devices 56, 58, 60 each, those skilled in the art will realize that any number of memory devices such as eight or nine may be provided. Internal to each memory module each of the memory devices 56, 58, 60 has an input coupled to the output of the register 54. Again, similar to the second embodiment, a signal path is daisy-chained between each of the memory devices 60, 58, 56 such that the initialization signal can be sequentially passed to each memory device 60, 58, 56 thereby selectively enabling the acceptance of the next ID-assignment packet to each memory device 56, 58, 60 regardless of the number of memory devices 56, 58, 60 in the system 20c or in each memory module 50a, 50b, 50c. Based on the descriptions of the second and third embodiments of the present invention, those skilled in the art will understand how such a daisy-chained connection for the initialization signal can be maintained regardless of the number of memory modules 50a, 50b, 50c or memory devices 56, 58, 60 added. Those skilled in the art will further realize that present invention can also be applied to memory architectures where the memory modules have different numbers memory devices, such as an architecture where half the memory modules include four random access memories (type-A) and the other half of the memory modules include eight random access memories (type-B), where each of the bi-directional data buses attaches to one-of-four type-A memories or two-of-eight type-B memories, and the type-B memories have half as many data bus pins.

Figure 5A:
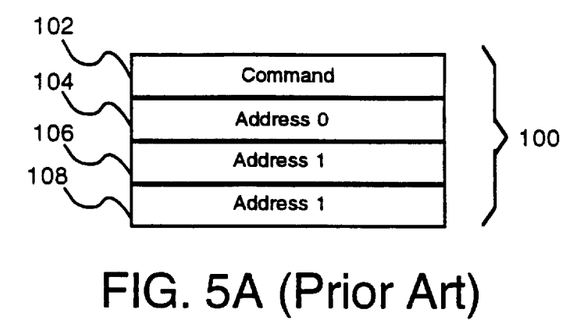
FIG. 5A is a graphical representation of the data packet used in prior art.

Referring now to FIG. 5A, a data packet 100 used in prior art systems is shown. The prior art data packet 100 includes four fields: a command field 102, an first address field 104, a second address field 106, and a third address field 108. This packet 100 was sent on the bus to all devices and those devices having a chip select line (e.g., as in FIG. 1A) asserted would respond. Such prior art systems were severely limited because only the memory device with a chip select signal asserted would be operational and responsive. However, the problem with such prior art systems was that they did not provide an mechanism to identify specific groups of memory devices for operation. Thus, they are not able to achieve any of the advantages of the present invention.

Figure 5B:
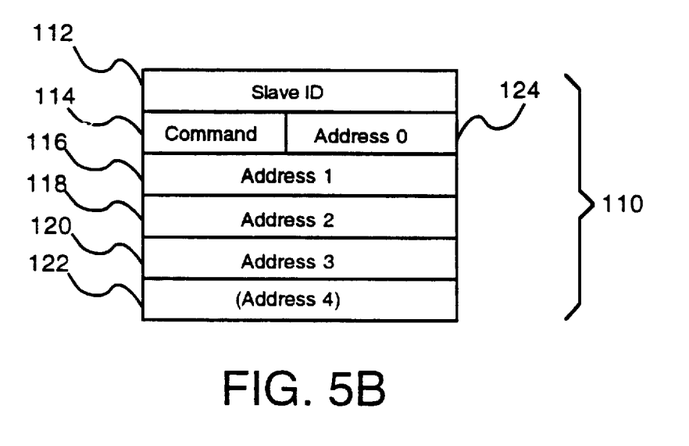
FIG. 5B is a graphical representation of a first embodiment of a multicasting packet defined according to the present invention.

Referring now to FIG. 5B, an exemplary command packet 110 employed in all the embodiments of the memory system 20 according to the present invention is shown. The packet 100 preferably includes a plurality of fields 112, 114, 116, 118, 120, 122, and 124. The first field is a SlaveID field 112 for holding an slave identification number. The value in the SlaveID field 112 has a value that is compared at each memory device 30 to determine whether the memory device 30 will be operational. The SlaveID field 112 can have a value that identifies a particular memory to be operational or a plurality of memories to be operational. According to the preferred embodiment of the present invention the multicasting signal or slave identification number either identifies a particular one memory device 30 as being operational or groups in powers-of-two (2,4, 8 or 16) up to as many as sixteen memory devices 30. A table of exemplary slave identification numbers and the memory devices that become operational when the slave identification numbers are sent in the packet 110 over the bus 26 for a system that includes 128 memory devices and where the slave identification number is eight bits is detailed in Appendix A.

The second field in the multicast packet 110 is a command field 114. The command field 114 has a value (an opcode) representing a command. Such a command may include read, write, refresh, prefetch, precharge, ID assignment, etc. For read and write commands, the remaining third through seventh fields 124, 116, 118, 120, 122 provide memory-chip local address values. An address0 field 124 contains a first address value; an address1 field 116 contains a second address value; an address2 field 118 contains a third address value; an address3 field 120 contains a forth address value; and an address4 field 122 (if necessary) contains a fifth address value. In the exemplary embodiment, the command and address bus 26 is preferably 10 bits wide with 8 lines for information, one line for clock signal, and one line as a flag line. Alternatively, there may be 9 lines for information with one bit provided for parity. Those skilled in the art will realize that the bus 26 may include other signal lines necessary for initialization and power, and that such signals have no affect on the packet size. Consistent with such an exemplary bus width, the slaveID field 112, the address1 field 116, the address2 field, the address3 field, and the address4 field 122 are each eight bits while the command field 114 and the address0 field 124 are each four bits. Thus, the size of the packet 110 is preferably six bytes for read and write operations. Those skilled in the art will realize that other configurations of the packet 110 are possible depending on the number of data lines or bits provided by the bus 26. For example, packets only two bytes in size could be used for broadcasting refresh and initialization signals to the memory devices 30, 32, 34 as addresses are not needed for these operations.

Figure 5C:
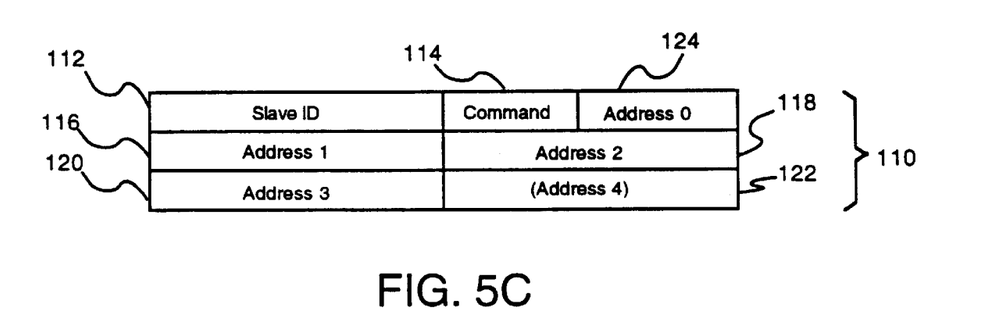
FIG. 5C is a graphical representation of a second embodiment of a multicasting packet.

A second and preferred embodiment for the packet 110 is shown in FIG. 5C. This embodiment of the packet 110 is provided for use where the command and address bus 26 includes 16 information lines, a clock line, and a flag line. The packet 110 retains the same number of bits for each field 112, 114, 116, 118, 120, 122, and 124, however, since there are double the number of data lines, the packet 110 can be sent the memory devices 30, 32, 34 in half the number of clock transitions.

Figure 5D:
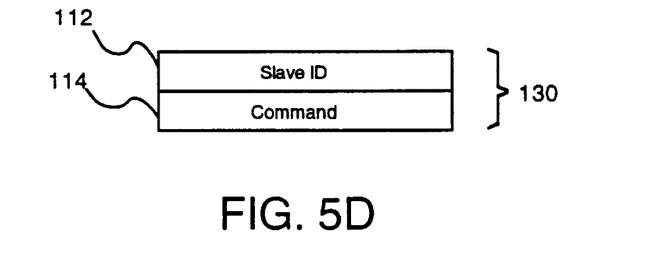
FIG. 5D is a graphical representation of a third embodiment of a multicasting packet.

A third embodiment for the packet 110 is shown in FIG. 5D. This embodiment of the packet 110 is provided for use such as during initialization when storing unique memory identification numbers in the respective slave ID register 70 of each memory device. The packet 130 preferably only provides two fields 112, 114. The first field 112 is used to contain a memory identification number and the second field 114 is used to contain a command.

Figure 6A:
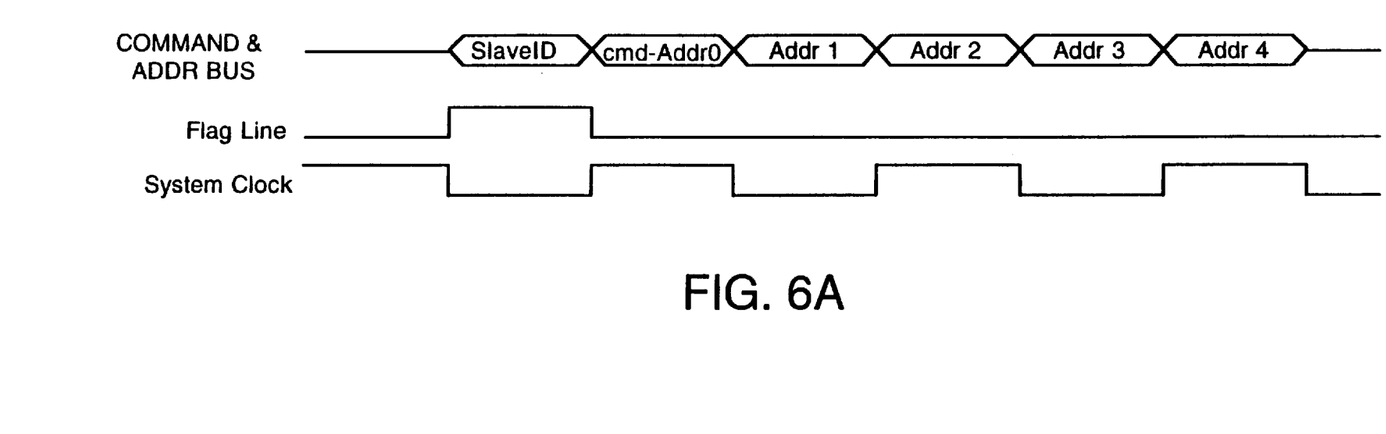
FIG. 6A is a timing diagram showing the signals as asserted on the a first embodiment of the first bus.
Figure 6B:
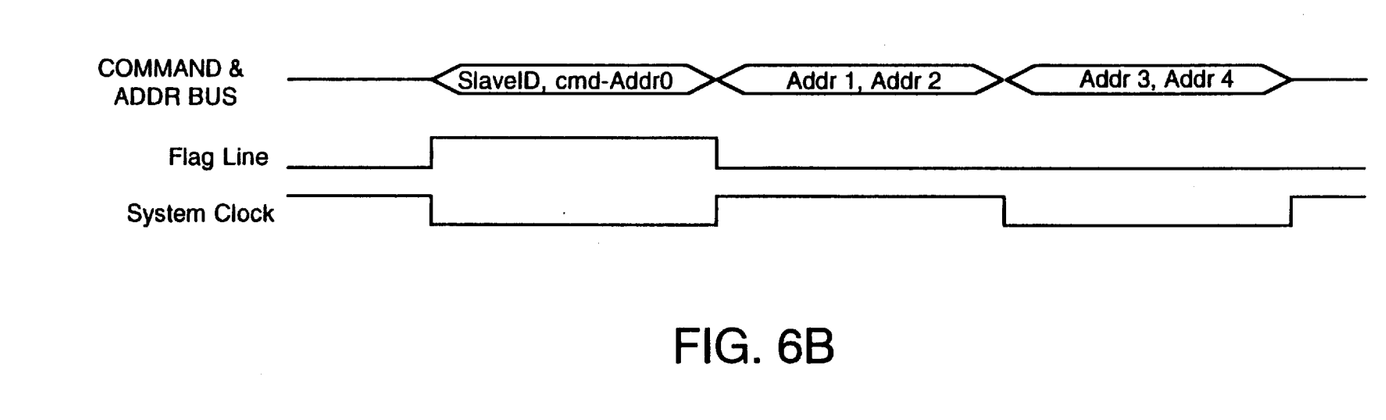
FIG. 6B is a timing diagram showing the signals as asserted on the a second embodiment of the first bus.

Referring now to FIGS. 6A and 6B two methods for multicasting the packet 110 from the memory controller 22a to the memory devices 30,32,34 (of FIG. 2) are shown. The first method assumes that the bus 26 includes 8 lines for information, one line as a flag line, and one line for a system clock, and is shown in FIG. 6A. For the first method, the packet 110 has the form described above in FIG. 5B for the first embodiment. As shown in FIG. 6A, transmission of the packet begins with the SlaveID being asserted on the bus 26. The beginning of transmission of a packet is signaled by the memory controller 22a to the memory devices 30, 32, 34 by the assertion of the flag line. The memory controller 22a asserts the SlaveID on the bus 26 simultaneously with assertion of the flag line for half a period of the system clock (until the next transition in the clock signal). At the next transition in the clock signal, the command field 114 and the address0 field 124 are asserted on the bus 26 by the memory controller 22a, and the flag line returns to its normal, unasserted state. At the second transition in the clock signal following assertion of the flag line, the memory controller 22a asserts the address0 field 124 asserted on the bus 26. The memory controller 22a continues by automatically and sequentially asserting each of the remaining fields 116, 118, 120 and 122 of the packet 110 at each following transition in the system clock until the entire packet 110 has been transmitted over the bus 26.

The second method for multicasting the packet 110 from the memory controller 22a to the memory devices 30, 32, 34 (of FIG. 2) operates in a similar manner. The second method assumes that the bus 26 includes 16 lines for data, one line as a flag line, and one line for a system clock, and is shown in FIG. 6B. For the second method, the packet 110 has the form described above in FIG. 5C as the second embodiment. As illustrated in FIG. 6B, the beginning of transmission of a packet is again signaled by the memory controller 22a to the memory devices 30, 32, 34 by the assertion of the flag line. Simultaneously with assertion of the flag line, the memory controller 22a sends the slaveID field 112, the command field 114 and the address0 field 124 on the bus 26. The memory controller 22a asserts these fields on the bus 26 simultaneously with assertion of the flag line for half a period of the system clock or until the next transition in the clock signal. At the next transition in the clock signal, the address1 field 116 and the address2 field 118 are asserted on the bus 26 by the memory controller 22a, and the flag line returns to an unasserted state. At the next transition in the clock signal, the memory controller 22a completes transmission of the packet 110 by providing address3 field 120 and the address4 field 122 on the bus 26.

Figure 7:
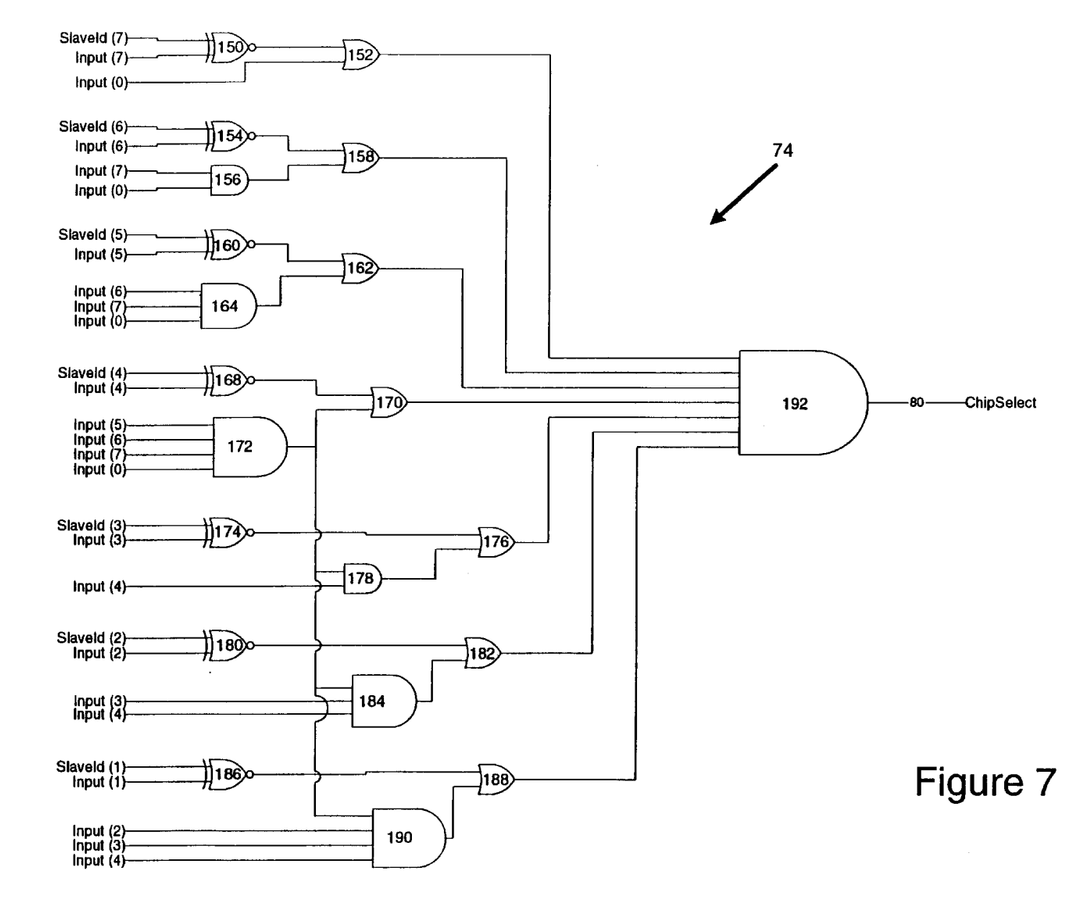
FIG. 7 is schematic diagram of a first embodiment of a decoder of the present invention.
Figure 8:
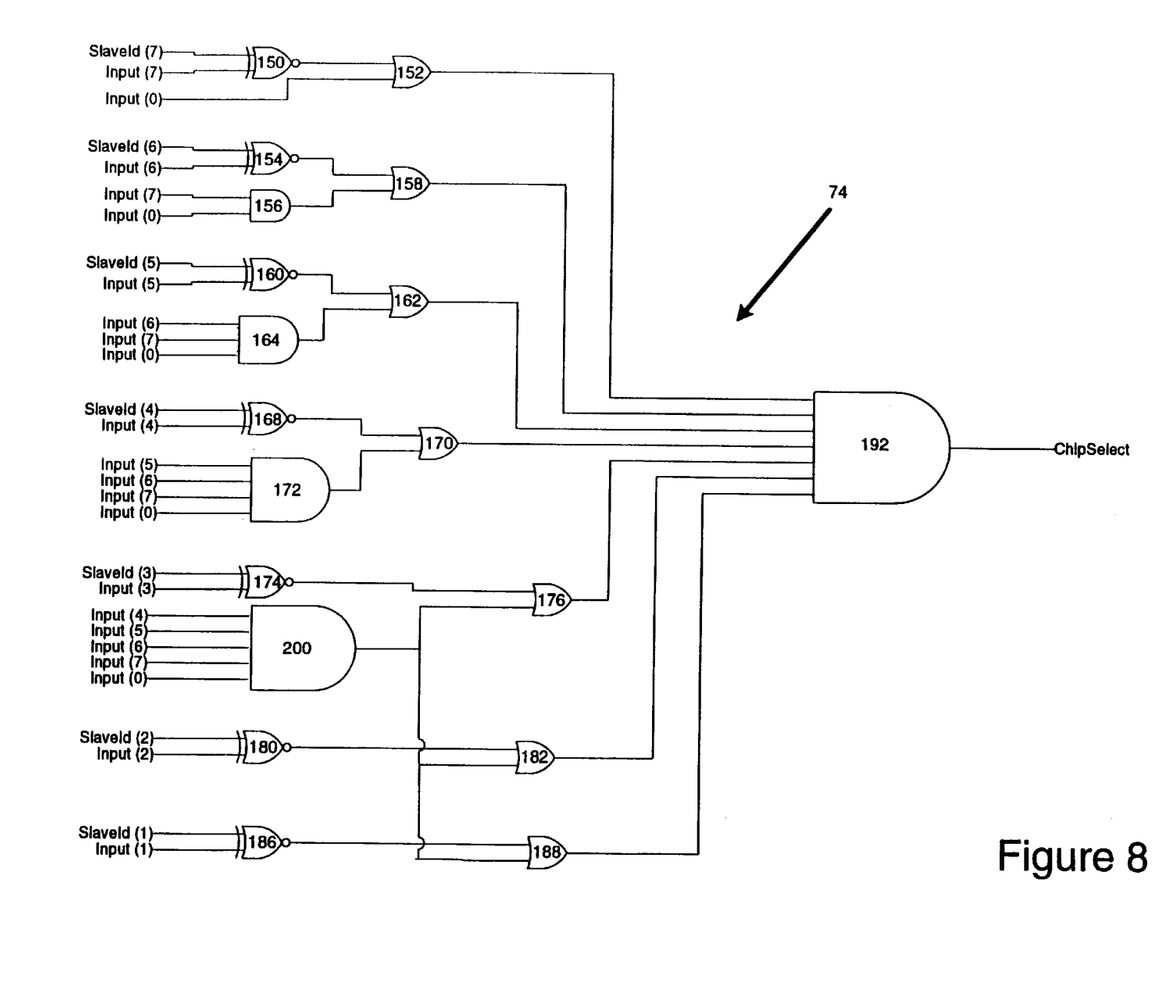
FIG. 8 is schematic diagram of a second embodiment of the decoder of the present invention.

Finally, referring now to FIGS. 7 and 8, two exemplary embodiments for the comparator 74 are shown. In these figures, input(0) through input (7) are the most through least significant bits of the address/command signals where the SlaveID value is located (Signals on 26 of FIG. 3). Also, SlaveID(0) through SlaveID(7) are the most through least significant bits of the memory device's slave ID register 70 (Signals on line 75 of FIG. 3). As has been indicated above, the present invention advantageously provides a multicasting system in which one or several memory devices may be selected for operation. According to one preferred embodiment of the present invention, the number of bits in the slaveID field is enough bits to provide each memory device 30 with a unique value plus at least one bit. Therefore, in exemplary system having 128 memory devices, the number of bits needed for the slaveID field is eight. The slaveID field provides a unique address for selecting each individual memory device to be operational. The lower 128 addresses (0–127) (seven bits) are used to address individual chips, and the higher 128 addresses (127–255) are used to specify multicasting addresses where two or more memory devices are selected simultaneously. Thus, after 128, every other one of the addresses is preferably used to specify two or more memory devices to be operational simultaneously (i.e., ×2 multicasting addresses). Thus, slaveID values of {0,1} are accessed using multicast address 128, slaveID values of {2,3} are accessed using multicast address 130, slaveID values of {4,5} are accessed using multicast address 132, etc. Of the remaining 64 multicast addresses in the upper 128 addresses, every other one specifies an ×4 multicast address where four memory devices are operational simultaneously. Thus, slaveID values of {0, 1, 2, 3} are accessed using multicast address 129, slaveID values of {4, 5, 6, 7} are accessed using multicast address 133, slaveID values of {8, 9, 10, 11} are accessed using multicast address 137, etc. Of the remaining 32 multicast addresses, every other one specifies a ×8 multicast address where eight memory devices are operational simultaneously. Thus, slaveID values of {0, 1, . . . 6, 7} are accessed using multicast address 131, slaveID values of {8, 9, . . . 14, 15} are accessed using multicast address 139, slaveID values of {16, 17, . . . 22, 23} are accessed using multicast address 147, etc. Of the remaining 16 multicast addresses, every other one specifies a ×16 multicast address. Thus, slaveID values of {0, 1, . . . 14, 15} are accessed using multicast address 135, slaveID values of {16, 17, . . . 30, 31} are accessed using multicast address 151, slaveID values of {32, 33 . . . 46, 47} are accessed using multicast address 167, etc. A complete set of address assignments is listed in Appendix A. The first column indicates the slave ID value. The second column indicate the memory devices that be come operational when the address is asserted, and the memory devices are specified using the slave ID values.

As shown in FIG. 7, the comparator 74 may be made of combinational logic such that the output of the comparator 74 supplied by AND gate 192 provides an internal chip select signal 80 that can be used to the memory 78. The combinational logic of FIG. 7 implements addressing scheme detailed in Appendix A. The comparator 74 receives eight bits identified as input(0) through input(7) from the bus 26, and eight bits identified as SlaveID(0) through SlaveID (7) from the SlaveID register 70. FIG. 8 illustrates a second embodiment for the comparator 74. In the second embodiment, shown in FIG. 8, the combination logic has been simplified by not supporting multicasting addresses that the select 32 or 64 memory devices. In other words, only the multicasting address of the table in appendix A that select either 1, 2, 4, 6, 8, 16 or all memory devices to be operational simultaneously are valid addresses. For example, slaveID values of 143, 159, 175, 207, 223, and 239 would not be valid with the logic in FIG. 8. Those skilled in the are will realize that the multicasting addressing scheme may be take a variety of other permutations of the addresses shown in Appendix A and therefore, a variety of other combinational logic implementations may be possible to implement similar schemes for addressing memory devices in groups having numbers that are powers of two.

While the present invention has been described with reference to certain preferred embodiments, those skilled in the art will recognize that various modifications may be provided. These and other variations upon and modifications to the preferred embodiments are provided for by the present invention, which is limited only by the following claims.

Appendix A - Multicast SIaveID Address

| SlaveID value | multicast range |
|---|---|
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 16 |
| 17 | 17 |
| 18 | 18 |
| 19 | 19 |
| 20 | 20 |
| 21 | 21 |
| 22 | 22 |
| 23 | 23 |
| 24 | 24 |
| 25 | 25 |
| 26 | 26 |
| 27 | 27 |
| 28 | 28 |
| 29 | 29 |
| 30 | 30 |
| 31 | 31 |
| 32 | 32 |
| 33 | 33 |

Appendix A - Multicast SlaveID Address

| SlaveID value | multicast range |
|---|---|
| 34 | 34 |
| 35 | 35 |
| 36 | 36 |
| 37 | 37 |
| 38 | 38 |
| 39 | 39 |
| 40 | 40 |
| 41 | 41 |
| 42 | 42 |
| 43 | 43 |
| 44 | 44 |
| 45 | 45 |
| 46 | 46 |
| 47 | 47 |
| 48 | 48 |
| 49 | 49 |
| 50 | 50 |
| 51 | 51 |
| 52 | 52 |
| 53 | 53 |
| 54 | 54 |
| 55 | 55 |
| 56 | 56 |
| 57 | 57 |
| 58 | 58 |
| 59 | 59 |
| 60 | 60 |
| 61 | 61 |
| 62 | 62 |
| 63 | 63 |
| 64 | 64 |
| 65 | 65 |
| 66 | 66 |
| 67 | 67 |
| 68 | 68 |
| 69 | 69 |
| 70 | 70 |
| 71 | 71 |
| 72 | 72 |
| 73 | 73 |
| 74 | 74 |
| 75 | 75 |
| 76 | 76 |
| 77 | 77 |
| 78 | 78 |
| 79 | 79 |
| 80 | 80 |
| 81 | 81 |
| 82 | 82 |
| 83 | 83 |
| 84 | 84 |
| 85 | 85 |
| 86 | 86 |
| 87 | 87 |
| 88 | 88 |
| 89 | 89 |
| 90 | 90 |
| 91 | 91 |
| 92 | 92 |
| 93 | 93 |
| 95 | 95 |
| 95 | 95 |
| 96 | 96 |
| 97 | 97 |
| 98 | 98 |
| 99 | 99 |
| 100 | 100 |
| 101 | 101 |
| 102 | 102 |
| 103 | 103 |
| 104 | 104 |
| 105 | 105 |
| 106 | 106 |
| 107 | 107 |
| 108 | 108 |
| 109 | 109 |
| 110 | 110 |
| 111 | 111 |
| 112 | 112 |
| 113 | 113 |
| 114 | 114 |
| 115 | 115 |
| 116 | 116 |
| 117 | 117 |
| 118 | 118 |
| 119 | 119 |
| 120 | 120 |
| 121 | 121 |
| 122 | 122 |
| 123 | 123 |
| 124 | 124 |
| 125 | 125 |
| 126 | 126 |
| 127 | 127 |
| 128 | 0–1 |
| 129 | 0–3 |
| 130 | 2–3 |
| 131 | 0–7 |
| 132 | 4–5 |
| 133 | 4–7 |
| 134 | 6–7 |
| 135 | 0–15 |
| 136 | 8–9 |
| 137 | 8–11 |
| 138 | 10–11 |
| 139 | 8–15 |
| 140 | 12 13 |
| 141 | 12–15 |
| 142 | 14–15 |
| 143 | 0–31 |
| 144 | 16–17 |
| 145 | 16–19 |
| 146 | 18–19 |
| 147 | 16–23 |
| 148 | 20–21 |
| 149 | 20–23 |
| 150 | 22–23 |
| 151 | 16–31 |
| 152 | 24–25 |
| 153 | 24–27 |
| 154 | 26–27 |
| 155 | 24–31 |
| 156 | 28–29 |
| 157 | 28–31 |
| 158 | 30–31 |
| 159 | 0–63 |
| 160 | 32–33 |
| 161 | 32–25 |
| 162 | 34–35 |
| 163 | 32–39 |
| 164 | 36–37 |
| 165 | 36–39 |
| 166 | 38–39 |
| 167 | 32–47 |
| 168 | 40–41 |
| 169 | 40–43 |
| 170 | 42–43 |
| 171 | 40–47 |
| 172 | 44–45 |
| 173 | 44–47 |
| 174 | 46–47 |
| 175 | 32–63 |
| 176 | 48–49 |
| 177 | 48–51 |
| 178 | 50–51 |
| 179 | 48–55 |
| 180 | 52–53 |
| 181 | 52–55 |
| 182 | 54–55 |
| 183 | 48–63 |

-continued

Appendix A - Multicast SlaveID Address

| SlaveID value | multicast range |
|---|---|
| 184 | 56–57 |
| 185 | 56–59 |
| 186 | 58–59 |
| 187 | 56–63 |
| 188 | 60–61 |
| 189 | 60–63 |
| 190 | 62–63 |
| 191 | 0–127 |
| 192 | 64–65 |
| 193 | 64–67 |
| 194 | 66–67 |
| 195 | 64–71 |
| 196 | 68–69 |
| 197 | 68–71 |
| 198 | 70–71 |
| 199 | 64–79 |
| 200 | 72–73 |
| 201 | 72–75 |
| 202 | 74–75 |
| 203 | 72–79 |
| 204 | 76–77 |
| 205 | 76–79 |
| 206 | 78–79 |
| 207 | 64–95 |
| 208 | 80–81 |
| 209 | 80–83 |
| 210 | 82–83 |
| 211 | 80–87 |
| 212 | 84–85 |
| 213 | 84–87 |
| 214 | 86–87 |
| 215 | 80–95 |
| 216 | 88–89 |
| 217 | 88–91 |
| 218 | 90–91 |
| 219 | 88–95 |
| 220 | 92–93 |
| 221 | 92–95 |
| 222 | 94–95 |
| 223 | 64–127 |
| 224 | 96–97 |
| 225 | 96–99 |
| 226 | 98–99 |
| 227 | 96–103 |
| 228 | 100–101 |
| 229 | 100–103 |
| 230 | 102–103 |
| 231 | 96–111 |
| 232 | 104–105 |
| 233 | 104–107 |
| 234 | 106–107 |
| 235 | 104–111 |
| 236 | 108–109 |
| 237 | 108–111 |
| 238 | 110–111 |
| 239 | 96–127 |
| 240 | 112–113 |
| 241 | 112–115 |
| 242 | 114–115 |
| 243 | 112–119 |
| 244 | 116–117 |
| 245 | 116–119 |
| 246 | 118–119 |
| 247 | 112–127 |
| 248 | 120–121 |
| 249 | 120–123 |
| 250 | 122–123 |
| 251 | 120–127 |
| 252 | 124–125 |
| 253 | 124–127 |
| 254 | 126–127 |
| 255 | 0–127 |

What is claimed is:

1. In a system having a memory controller coupled by a bus to a plurality of memory devices, a method for activating a group of memory devices for operation, the method comprising the steps of:

providing a unique memory identification number for each memory device;

transmitting, from the memory controller to the plurality of memory devices, a packet including an encoded memory device selection address identifying the group of memory devices, the group including at least two memory devices and less than the entire plurality of memory devices, and a command;

comparing the encoded memory device selection address to the memory identification number at each one of the plurality of memory devices; and enabling operation of each memory device where the memory identification number matches the memory device selection address to perform the command at the group of memory devices.

2. The method of claim 1 wherein step of providing comprises the step of storing the memory device selection address at the memory device prior to and for use in the comparing step.

3. The method of claim 1 wherein the step of providing an unique memory identification number for each memory device further comprises the steps of:

successively transmitting on the bus a series of unique identification numbers;

transmitting an initialization signal from the memory controller to a first memory device of the plurality of memory devices and then successively to each remaining memory device of the plurality of memory devices; and storing a unique identification number pre sent on the bus as the memory identification number for each memory device when the initialization signal is received.

4. The method of claim 1 wherein the step of transmitting a memory device selection address from the memory controller to the plurality of memory devices further comprises the steps of:

transmitting an identification number on the bus;

transmitting a command on the bus; and transmitting an address on the bus.

5. The method of claim 1 wherein the memory device selection address is encoded such that the number of memory devices in the group is two, four, eight or sixteen memory devices.

6. The method of claim 1 wherein the comparing step is performed by more than two memory devices, and wherein more than two memory devices are made operational.

7. A memory system providing activation of a group of memory devices for operation, the system comprising:

a first bus for transmitting commands and addresses;

a second bus for transmitting data;

a first memory device for storing data having a control input and a bi-directional port, the control input of the first memory device coupled to the first bus, the bi-directional port of the first memory device coupled to the second bus, the first memory device being selectively operable in response to a signal receive at the control input;

a second memory device for storing data having a control input and a bi-directional port, the control input of the second memory device coupled to the first bus, the bi-directional port of the second memory device coupled to the second bus, the second memory device being selectively operable in response to a signal received at the control input; and a memory controller having a first output and a bi-directional port, the first output of the memory controller coupled to the first bus and the bi-directional port of the memory controller coupled to the second bus, the memory controller for providing addresses and command to selectively operate one from the group of the first memory device, the second memory device and both the first and second memory devices.

8. The system of claim 7 wherein the first bus comprises a plurality of data signal lines, a clock signal line and a flag signal line, the flag signal line being used to indicate transmission of a command packet from the memory controller to the first and second memory devices.

9. The system of claim 7 wherein the memory controller creates and transmits a command packet including a memory device identification number, a command and at least one address.

10. The system of claim 7 wherein:

the memory controller has an initialization output and an initialization input, and provides an initialization signal for loading unique identification numbers into the first and second memory devices;

the first memory device has an initialization output and an initialization input, the initialization input of the first memory device coupled to the initialization output of the memory controller, the first memory device storing data at the control input of the first memory device as a first memory device identification number in response to the initialization signal at the initialization input of the first memory device; and the second memory device has an initialization output and an initialization input, the initialization input of the second memory device coupled to the initialization output of the first memory device, the initialization output of the second memory device coupled to the initialization input of the memory controller, the second memory device storing data at the control input of the second memory device as a second memory device identification number in response to the initialization signal at the initialization input of the first memory device.

11. The system of claim 7 further comprising:

a third memory device for storing data having a control input and a bi-directional port, the control input of the third memory device coupled to the first bus, the bidirectional port of the third memory device coupled to the second bus, the third memory device being selectively operable in response to a signal received at the control input; and wherein the memory controller selectively operates one from the group of the first memory device, the second memory device, the third memory device, the first and second memory devices, the first and third memory devices, the second and third memory devices or the first, second and third memory devices.

12. The system of claim 7 further comprising a buffer having an input and an output, the input of the buffer coupled to the first bus and the output coupled to the control input of the third memory device, the control input of the second memory device, and the control input of the third memory device.

13. The system of claim 7 wherein the first and second memory device each comprise:

a memory having control inputs and a data port for storing data, the data port of the memory device coupled to the second bus;

an identification register having an output and storing a unique memory device number;

a comparator having a first input, a second input and an output for comparing addresses, the first input of the comparator coupled to the output of the identification register, the second input of comparator coupled to the first bus; and control logic having a select input, control input and outputs, the control logic decoding command and address information and selectively operating the memory device in response to a signal at the select input, the select input coupled to the output of the comparator, the control inputs coupled to the first bus, and the control outputs coupled to the control inputs memory device.

14. The system of claim 13 further comprising initialization logic providing a output coupled to a control input of the identification register for loading a unique identification number into the identification register.

15. The system of claim 13 wherein the control logic includes buffers and combinational logic necessary to decode a packet formed of a plurality of bytes sequentially transmitted over the first bus.

16. The system of claim 13 wherein the comparator includes combinational logic coupled such that the comparator will assert an internal chip select signal when the signal on the first bus is one of group of addresses that matches a value stored in the identification register.

17. An apparatus for storing data in a multicasting memory addressing system, the apparatus comprising:

memory device having control inputs and a data port for storing data, the data port of the memory device coupled to the second bus;

an identification register having an output and storing a unique memory device number;

a comparator having a first input, a second input and an output for comparing addresses, the first input of the comparator coupled to the output of the identification register, the second input of comparator coupled to the first bus; and control logic having a select input, control input and outputs, the control logic decoding command and address information and selectively operating the memory device in response to a signal at the select input, the select input coupled to the output of the comparator, the control inputs coupled to the first bus, and the control outputs coupled to the control inputs memory device.

18. The apparatus of claim 17 further comprising initialization logic providing a output coupled to a control input of the identification register for loading a unique identification number into the identification register.

19. The apparatus of claim 17 wherein the control logic includes buffers and combinational logic necessary to decode a packet formed of a plurality of bytes sequentially transmitted over the first bus.

20. The apparatus of claim 17 wherein the comparator includes combinational logic coupled such that the comparator will assert an internal chip select signal when the signal on the first bus is one of group of addresses that matches a value stored in the identification register.

* * * * *